Figure 1:
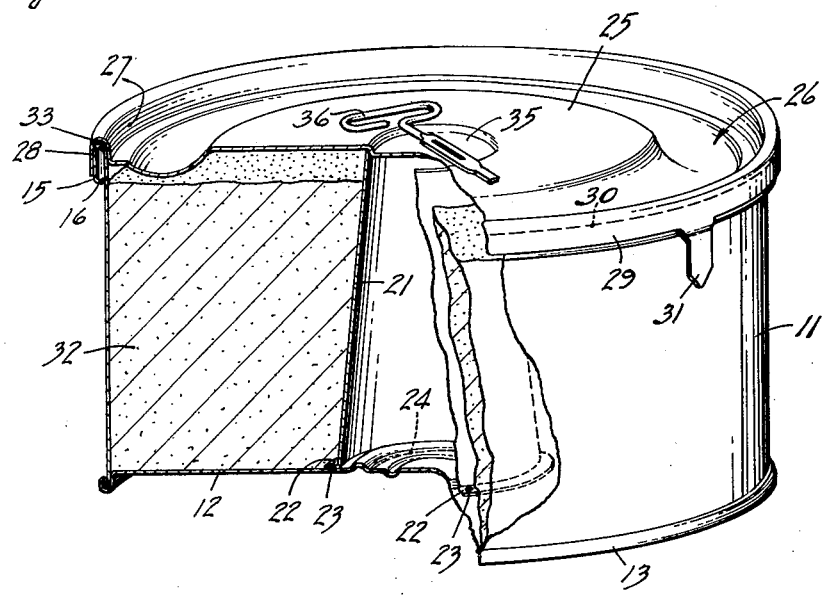

May 5, 1936.  J. M. YOUNG  2,039,374

CONTAINER

Filed Aug. 1, 1934

INVENTOR
John M. Young
BY
ATTORNEYS

Patented May 5, 1936

2,039,374

UNITED STATES PATENT OFFICE 2,039,374

CONTAINER

John M. Young, Brooklyn, N. Y., assignor to American Can Company, New York, N. Y., a corporation of New Jersey Application August 1, 1934, Serial No. 738,007

5 Claims. (Cl. 220—1)

The present invention relates to containers or cans and has particular reference to a convertible can adapted to hermetically enclose a cake mixture or the like and after opening, the can may be used as a baking vessel in which the dough made from the cake mixture or other canned contents may be effectively baked without recourse to any other baking utensil.

In modern apartment life in the larger cities the number and variety of cooking utensils must be reduced to a minimum owing to lack of space and accordingly baking vessels are often absent in apartment kitchens. The present invention contemplates the provision of a special combination and convertible can for use in hermetically sealing a cake mixture or the like which after opening becomes available as a baking vessel for baking a cake or other pastry delicacy made from the can contents, the combination can thus being completely self-contained and requiring a minimum of effort on the part of the housewife in opening it and in preparing its contents for use.

An object of the present invention is the provision of a combination can which in its first use functions as a hermetically sealed container and which after opening is convertible into a baking vessel in which the canned contents may be fully prepared without the need of other baking utensils.

A further object of the invention is the provision of a can of the character described which contains enclosed elements for rendering it available after opening as a baking vessel.

Another object of the invention is the provision of a can having a central heat conducting tube embodied within its structure, the can being specifically adapted for containing a cake mixture or the like and after the can and the heat conducting tube are both opened the cake dough prepared from the content mixture may be baked in the same can.

Numerous other objects and advantages of the invention will be apparent as it is better understood from the following description, which, taken in connection with the accompanying drawing, discloses a preferred embodiment thereof.

Figure 2:
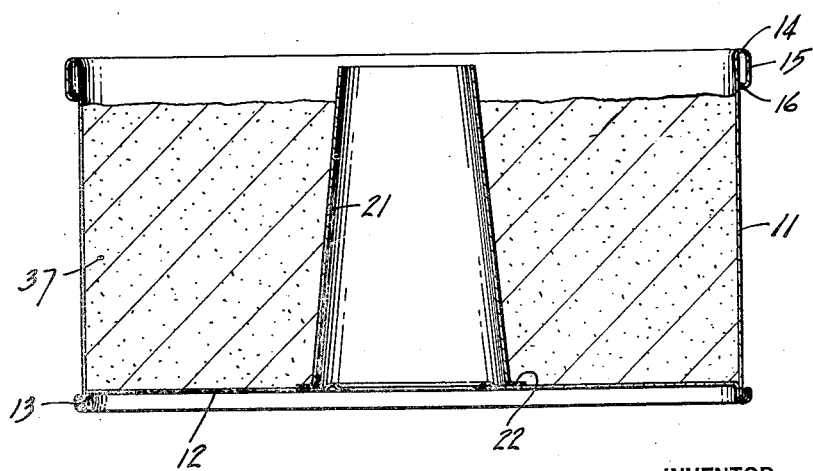

Referring to the drawing:

Figure 1 is a perspective view partly broken away of a filled and sealed combination and convertible can embodying the present invention; and Fig. 2 is a transverse sectional view of the can after it has been opened and conditioned as a baking vessel.

The can illustrated in the drawing comprises a body 11 having a bottom end 12 hermetically secured thereto as in a double seam 13. The upper edge of the can body 11 is curled outwardly at 14 and extends down a substantial distance parallel to and outside of the body wall to provide an annular body sealing wall 15 which preferably terminates in an inwardly curled edge 16.

A tapered or conical heat conducting tube 21 is disposed centrally within the can and the lower end of the tube is formed with a flange 22 which is secured on the can bottom 12 in any suitable manner as by spot welding indicated at 23. The can bottom 12 is partially cut through in an annular score line 24 which is located within the boundary of the tube flange 22.

A top end or cover 25 is provided for closing the can and is formed with a countersunk channel 26 bounded by an inner annular wall 27 and an outer parallel depending annular flange wall 28. The latter is of substantial width and is of a predetermined smaller diameter than the diameter of the body sealing wall 15. A tearing strip 29 is formed in the cover flange, being set off by a score line 30. A tongue 31 extends down from the lower edge of the flange 28 and provides a means for removing the tearing strip in opening the can.

The filled can with contents 32 is closed by the cover 25 being driven onto its upper open end. A suitable gasket 33 is preferably located in the groove formed in the curved junction of the parallel cover walls 27, 28 and when the can cover is brought into its sealing position the gasket is tightly jammed down on the upper curl of the can body 11. In reaching this position the metal of the flange wall 28 is stretched within the limits of its elasticity and the walls 15, 28 of body and cover together with the enclosed gasket 33 form a hermetic seal for the can. It may be desirable to seal the can so as to enclose an inert gas with the can contents and the hermetic character of the sealed can permits this.

The cover 25 is centrally depressed at 35 and when it is driven into the sealing position, this depression enters into the upper end of the conical tube 21 and provides a joint between tube and can cover which prevents the contents 32 passing into the inside of the tube. A key 36 may be welded or otherwise secured to the can cover and is used when the can is to be opened.

In using the key 36 for opening the can its slot is arranged upon the tongue 31 and the tearing strip 29 is torn off from the can in the usual manner. After removal of the tearing strip the cover may be easily lifted from can closing position. The contents of the can is then removed and prepared for baking.

The score line 24 in the can bottom 12 is broken through and the center part of the bottom, that is the disc set off by and contained inside of the score line, is removed. This opens the lower end of the tube 21, and completes the conversion of what was a shipping can into a baking vessel as disclosed in Fig. 2. The prepared cake dough indicated by the numeral 37 is then returned to the converted can and baked in the usual manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. A can for cake mixture and the like comprising a body, ends connected with said body, and a heat conducting tube disposed inside of said body and extending between said ends, said ends closing the ends of said tube and one of said ends being adapted for removal from said body to open the can and the other of said ends being adapted by partial removal to provide an opening communicating with the interior of said heat conducting tube so that the open can becomes effective as a baking vessel.

2. A can for cake mixture and the like comprising a body, ends hermetically connected with said body, and a heat conducting tube disposed inside of said body and extending between said ends, said ends closing the ends of said tube and one of said ends being adapted for removal from said body to open the can and to open the upper end of said tube, that portion of the other of said ends which is contained inside of the bottom end of said tube being also adapted for removal to completely open up the interior of the tube and make the opened can effective as a baking vessel.

3. A can for cake mixture and the like comprising a body, ends hermetically sealed to said body, and a heat conducting tube disposed inside of said body having its ends connected with the ends of the can in joints which close the ends of the tube and prevent the can contents from entering the said tube, one of said can ends being adapted for removal from said body to open the can and the other of said can ends being adapted for partial removal to provide an opening for the interior of said heat conducting tube so that the opened can becomes effective as a baking vessel.

4. A can for cake mixture and the like comprising a body, a bottom end hermetically secured thereto, a top end also hermetically secured to said body and having a removable tearing strip by which the can is opened to obtain access to its contents, and a heat conducting tube centrally disposed in the can and secured to said bottom end and tightly engaging said top end when the can is hermetically sealed, said bottom end being centrally scored to set off a removable area, the removal of which opens up the bottom end of said tube and renders the opened can effective as a baking vessel.

5. A can for cake mixture and the like, comprising a body having a sealing area of predetermined diameter at its top end, a bottom hermetically secured to the bottom end of said body, a can cover having a depending flange of substantial width and predetermined smaller diameter than said body sealing area and having a portion providing a tearing strip, said flange being adapted to be stretched within the limits of its elasticity by forcing the same over said body area to form a tight seal with the latter, said flange being in a condition of tension to the point that the said top is permanent with and irremovable from said body prior to opening of the can by removal of said tearing strip when access to its contents is desired, and a heat conducting tube centrally disposed within the can and secured to the said bottom and tightly engaging the said cover, said bottom being centrally scored to set off a removable area the removal of which opens up the bottom end of said tube and renders the opened can effective as a baking vessel.

JOHN M. YOUNG.